E. D. CAIN.

WATER COLUMN.

No. 11,662. Reissued May 3, 1898.

Witnesses:

H. H. Eldredge

C. Hunter Cayce

Inventor:

Ephraim D. Cain

By Eugene Ayres,

Attorney

UNITED STATES PATENT OFFICE.

EPHRAIM D. CAIN, OF WEATHERBY, MISSOURI.

WATER-COLUMN.

SPECIFICATION forming part of Reissued Letters Patent No. 11,662, dated May 3, 1898.

Original No. 595,557, dated December 14, 1897. Application for reissue filed January 20, 1898. Serial No. 667,520.

*To all whom it may concern:*

Be it known that I, EPHRAIM D. CAIN, a citizen of the United States, residing at Weatherby, in the county of De Kalb and State of Missouri, have invented certain new and useful Improvements in Water-Columns; and I do hereby declare that the following is a full, clear, and exact description of the invention, that will enable others skilled in the art to which it appertains to make and use the same, reference being had to the accompanying drawings, and to the figures of reference marked thereon, which form a part of this specification.

My invention relates to that class of water-columns which are designed to be placed at suitable intervals near railroad-tracks for the purpose of supplying locomotive-tenders with water, the water-column being supported in a vertical position and adapted to be swung to the right or left in the same way as all ordinary water-columns.

The objects of my improvements are, first, to provide a water-column in which the horizontal discharge-spout may be easily and quickly swung around to the right or left into position; second, to provide a water-column so constructed that the discharge-spout may be readily lowered to suit the various heights of locomotive-tenders; third, to provide a water-column that by positive action prevents leakage and waste of water and obviates all danger of freezing; fourth, a water-column so constructed that concussion in the pipe (commonly known as "water-knock") will be avoided; fifth, a water-column so arranged that the different parts will be of easy access, certain in operation, and simple in construction. I attain these objects by the mechanism illustrated in the accompanying drawings, in which—

Figure 1:
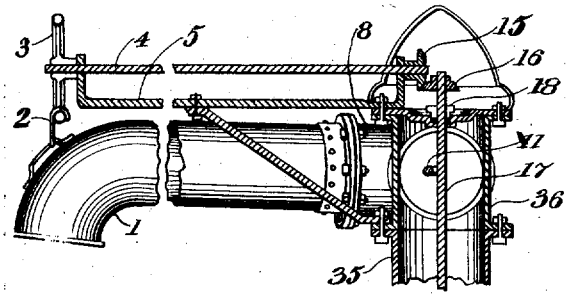
Figure 2:
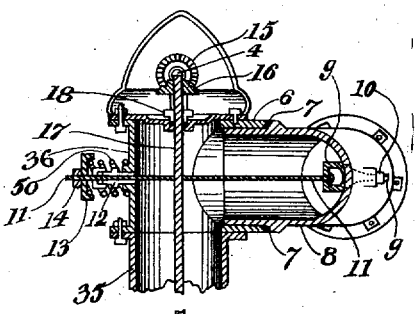
Figure 3:
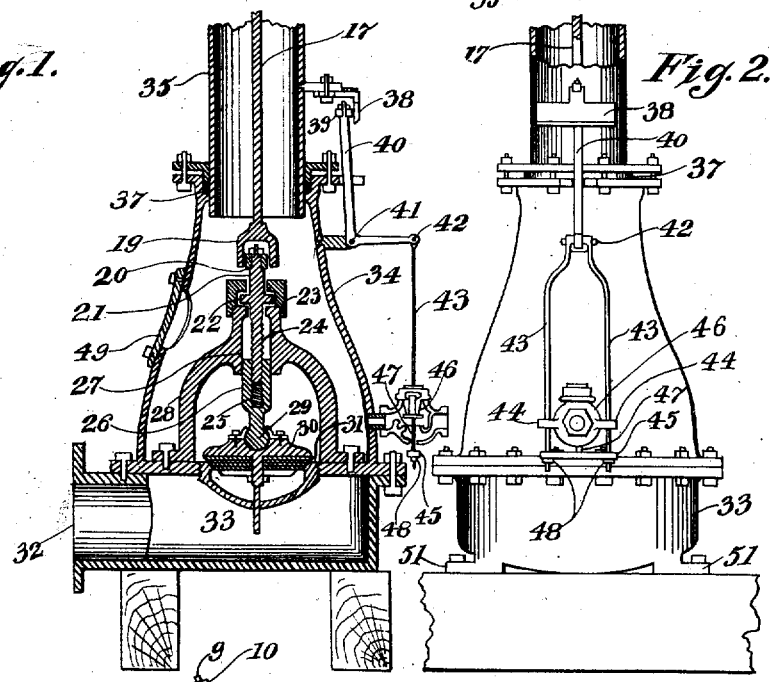
Figure 3:
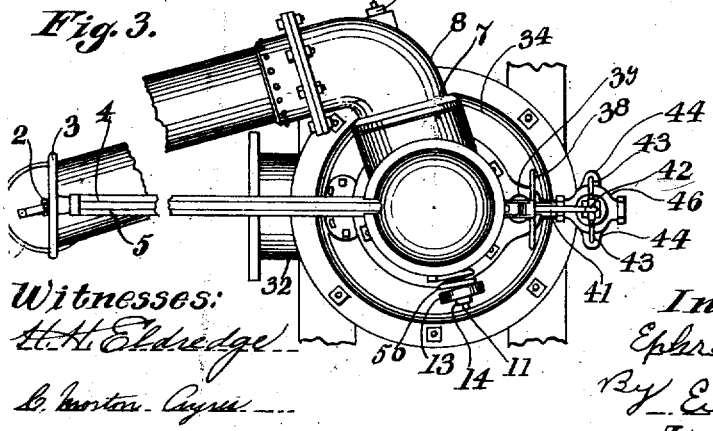

Figure 1 is a longitudinal section cut vertically through the center, the central part being broken out and omitted. Fig. 2 is a transverse section of certain parts and a rear elevation or view of certain parts. Fig. 3 is a top plan.

Similar figures refer to similar parts throughout the several views.

In the operation of my invention the operator swings discharge-spout 1 from the position seen in Figs. 1, 2, and 3 to a position at a right angle either to the right or to the left, as the location of the railroad may require, and after disengaging hook 2 (by which said delivery end of spout 1 is suspended from wheel 3 on shaft 4, supported in bearings on bracket 5) said operator lowers the delivery end of discharge-spout 1 into the manhole (not shown) of a locomotive-tender, said spout rotating in a horizontal or swing joint 6, provided with packing 7, held in place by swivel 9, secured to elbow 8 by nut 10, said swivel engaging a rod 11, passing from swivel 9 (see Fig. 2) through stuffing-box 12 and washer 13 and secured at its outer end by nut 14, which, together with spring 50, affords easy and automatic means for tightening the joint 6 against packing 7.

After the delivery end of discharge-spout 1 has been lowered into the manhole of a locomotive-tender water is turned on by means of hand-wheel 3, driving or rotating shaft 4, carrying miter-gear 15, engaging miter-gear 16, driving vertical shaft 17, which passes through stuffing-box 18 and is provided at its lower extremity with a square socket-wrench 19, which rotates the nut 20, driving or rotating valve-stem 21, held in place by shoulder 22, rotating in bonnet-nut 23. The lower end of valve-stem 21 is screw-threaded at 24, said threaded end engaging threaded perforation 25 in the square valve-nut 26, which is thus screwed upward in square perforation 27 in yoke 28 and by means of ball-joint 29 raises the preferably leather-faced brass valve 30 from seat 31, allowing free passage of water up through valve-chamber 34, upright main pipe 35, T 36, elbow 8, and discharge-spout 1 into the manhole of a locomotive-tender. When the operator swings discharge-spout 1 at right angles to the position shown, as hereinbefore described, the lower end of pipe 35 rotates in stuffing-box 37, and in its rotation pipe 35 carries adjustable inclined plate 38 from engagement with friction-roller 39, (see Fig. 1,) allowing said roller to be carried to the right by L-crank 40, rotating on pivot 41 by reason of the gravitation of pivotally-attached rods 43 43, passing through perforations in lugs 44 44 on check-valve body 46, and the gravitation of yoke 45, adjustable on rods 43 43 by nuts 48 48, thus allowing check-valve stem 47 and its attached check-valve to gravitate and close, preventing waste of water while locomotive-tender is being served with water. When desired, the valve 30 is closed by reverse rotation of hand-wheel 3 and the hereinbefore-described parts. The discharge-spout 1 is elevated to position shown, secured by hook 2, and discharge-spout 1 is returned to its position, as shown in Fig. 2, which is parallel with railway-track. It will be understood that when the discharge-spout 1 swings to the position shown in Fig. 1 the inclined plate 38 engages friction-roller 39 and connected parts, as described, thereby raising valve-stem 47 and its attached valve, allowing discharge-spout 1, pipe 35, and chamber 34 to be drained and prevent freezing of water in said parts. In summer or warm climates plate 38 is removed, thereby disconnecting the action on drainage check-valve.

32 is the inlet of chamber 34. 33 is the base of said chamber. I may provide easy access to the parts contained in chamber 34, as stated in the recital of the objects of my invention, by forming the walls of chamber 34 and its base-plate (which are shown in Figs. 1 and 2 integral) in separate parts and securing them together. 49 is a hand-hole cover which when removed allows easy access to the interior of said chamber, being simply a hand-hole plate on valve-chamber.

51 51 represent lugs to bolt the lower member of the water-column to the foundation-timber.

What I claim as my invention, and desire to secure by Letters Patent, is—

1. In a water-column the combination with the T 36 of the discharge-spout 1 arranged to have its delivery end raised and lowered and its elbow 8 to rotate in joint 6 said joint being provided with packing 7 and held in place and elastically tightened by swivel 9, spring 50 and intermediate parts, substantially as set forth and described.

2. The combination in a water-column of a discharge-spout 1 with inside elbow 8 rotating in swing-joint 6 with packing 7, swivel 9 engaging rod 11, spring 50 for the purpose of automatically taking up the wear on joint 6 and packing 7, together with wheel 3 and hook 2 for disengaging the delivery end of spout 1, bracket 5 and shaft 4 carrying miter-gear 15 engaging miter-gear 16 and driving vertical shaft 17 passing through stuffing-box 18 and having square socket-wrench 19 rotating nut 20, driving valve-stem 21 held in place by shoulder 22 rotating in bonnet-nut 23, the threaded end of valve-stem 21 engaging perforation 25 in the square valve-nut 26, square perforation 27, yoke 28, seat 31 and valve 30, ball-joint 29, valve-chamber 34 and the upright main pipe 35 and T 36, substantially as described and for the purpose specified.

3. In a water-column a horizontal discharge-spout with delivery end that may be raised or lowered at will in combination with T 36, main pipe 35 and valve-chamber 34, and check 47 with connecting mechanism for automatically controlling the drainage, substantially as described and for the purpose specified.

In testimony whereof I affix my signature in presence of two witnesses.

EPHRAIM D. CAIN.

Witnesses:

EMMA HECKEL,

I. N. MILLER.